(12) United States Patent
Blake (10) Patent No.: US 12,039,483 B2
(45) Date of Patent: Jul. 16, 2024

(54) STAGING UNMANNED AERIAL VEHICLES AT MERCHANT FACILITIES

(71) Applicant: WING Aviation LLC, Mountain View, CA (US)

(72) Inventor: Jesse Blake, Palo Alto, CA (US)

(73) Assignee: Wing Aviation LLC, Palo Alto, CA (US)

( * ) Notice: Subject to any disclaimer, the term of this patent is extended or adjusted under 35 U.S.C. 154(b) by 76 days.

(21) Appl. No.: 17/749,818

(22) Filed: May 20, 2022

(65) Prior Publication Data

US 2023/0410025 A1   Dec. 21, 2023

(51) Int. Cl.
*G06Q 10/083*   (2024.01)

(52) U.S. Cl.
CPC .................................. *G06Q 10/083* (2013.01)

(58) Field of Classification Search
CPC ....... G06Q 10/083; G06Q 50/40; G06Q 50/60
See application file for complete search history.

(56) References Cited

U.S. PATENT DOCUMENTS

| | | | |
|---|---|---|---|
| 9,841,757 B2 * | 12/2017 | Mikan | B64C 39/024 |
| 10,210,475 B2 | 2/2019 | Pargoe | |
| 10,597,157 B1 | 3/2020 | Schmalzried et al. | |
| 10,645,603 B2 | 5/2020 | Chalmer et al. | |
| 2016/0364989 A1 * | 12/2016 | Speasl | G08G 5/0082 |
| 2017/0110017 A1 * | 4/2017 | Kimchi | B64D 1/12 |
| 2017/0132562 A1 * | 5/2017 | High | G06Q 10/0833 |

(Continued)

FOREIGN PATENT DOCUMENTS

| | | | | |
|---|---|---|---|---|
| CN | 213768967 U | * | 7/2021 | ............. B64C 39/02 |
| CN | 114261517 A | * | 4/2022 | ............. B64C 35/00 |

(Continued)

OTHER PUBLICATIONS

Ali, Essam, Fanni, Mohamed, and Mohamed, Abdelfatah M., "A New Battery Selection System and Charging Control of a Movable Solar-Powered Charging Station for Endless Flying Killing Drones," Sustainability, 2022, 14, 2071, published Feb. 11, 2022.*

(Continued)

*Primary Examiner* — Nathan Erb
(74) *Attorney, Agent, or Firm* — CHRISTENSEN O'CONNOR JOHNSON KINDNESS PLLC (57) ABSTRACT

A UAV package delivery system includes a cabinet for deployment inside a merchant facility. The cabinet is configured for storing and charging UAVs on-site at the merchant facility remote from a command and control of the UAVs. The cabinet includes a plurality of cubbies, power circuitry, communication circuitry, and a controller. The cubbies are each sized and shaped to receive one of the UAVs. The power circuitry is configured for charging the UAVs when the UAVs are stowed within the cubbies. The communication circuitry is configured for communicating with the UAVs when the UAVs are proximate to the cabinet or stowed within the cubbies and for communicating with the command and control. The controller causes the UAV package delivery system to retrieve status information from the UAVs, relay the status information to the command and control, and relay mission data between the command and control and the UAVs.

20 Claims, 6 Drawing Sheets

(56) References Cited

U.S. PATENT DOCUMENTS

| | | | |
|---|---|---|---|
| 2017/0225802 A1 | 8/2017 | Lussier et al. | |
| 2018/0105289 A1 | 4/2018 | Walsh et al. | |
| 2019/0070995 A1 | 3/2019 | Cantrell et al. | |
| 2019/0193855 A1* | 6/2019 | Prager | B64D 1/10 |
| 2019/0383052 A1 | 12/2019 | Blake et al. | |
| 2020/0269283 A1* | 8/2020 | Ulrich | B07C 3/08 |
| 2020/0349852 A1* | 11/2020 | DiCosola | G08G 5/0043 |
| 2020/0349853 A1 | 11/2020 | Speasl et al. | |
| 2022/0058965 A1 | 2/2022 | Kimchi et al. | |
| 2022/0119105 A1 | 4/2022 | Schmalzried et al. | |

FOREIGN PATENT DOCUMENTS

| | | |
|---|---|---|
| WO | 2016205415 A1 | 12/2016 |
| WO | 2017029611 A1 | 2/2017 |

OTHER PUBLICATIONS

International Search Report and Written Opinion, mail date Jun. 14, 2023, in corresponding International Patent Application No. PCT/US2023/014385, 15 pages.

* cited by examiner

STAGING UNMANNED AERIAL VEHICLES AT MERCHANT FACILITIES

TECHNICAL FIELD

This disclosure relates generally to unmanned aerial vehicles (UAVs), and in particular but not exclusively, relates to merchant infrastructure for (UAVs).

BACKGROUND INFORMATION

An unmanned vehicle, which may also be referred to as an autonomous vehicle, is a vehicle capable of travel without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Controlling unmanned vehicles can be problematic especially when there are a large number of vehicles in close proximity. For unmanned aerial vehicles (UAVs), the terminal area from which the UAVs are staged (e.g., arrival and departure location) can be a high congestion choke point. Accordingly, techniques and systems that enable deployment of smaller fleets of UAVs in a dispersed or distributed manner alleviates the congestion problem. In parcel delivery applications, small, dispersed deployments of UAVs that are closer to the merchants using the aerial delivery service and also closer to the customers that receive the parcels can provide additional benefits including low latency deliveries, increased delivery throughput, and potentially higher market adoption.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for centralized control over a decentralized unmanned aerial vehicle (UAV) fleet stored in cabinets located at merchant facilities geographically dispersed across communities are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Conventionally, aircraft that provide commercial services are staged from terminal areas where they are directly supervised by on-site attendants/ground crew. Due to the conglomeration of arrives and departures, these terminal areas can be congested causing increased logistical challenges and can be noisy resulting in terminal areas being pushed further out into less inhabited areas. For a UAV package delivery service, conventional terminal areas are not ideal as the merchants that want to use the service need to setup remote operations adjacent to the terminal area away from their primary place of business. If the terminal area is placed in remote locations, such as commercial or rural districts, this may alleviate noise and congestion concerns, but does so at the expense of increased flight times to the customers, reducing delivery throughputs, and potentially being out of range for some urban or suburban customers.

Figure 1:
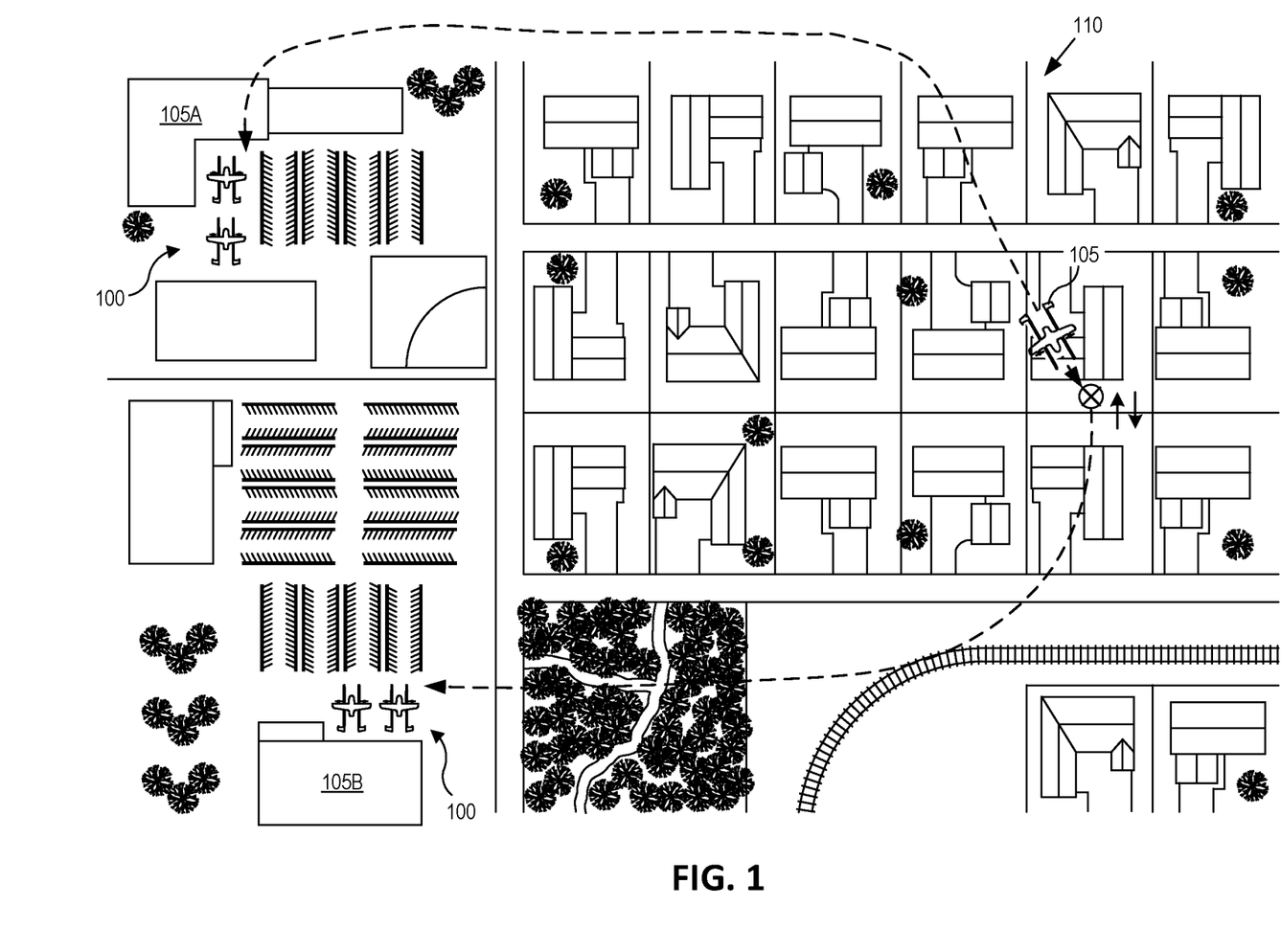
FIG. 1 illustrates a decentralized unmanned aerial vehicle (UAV) fleet deployed to merchant facilities distributed throughout a community, in accordance with an embodiment of the disclosure.

FIG. 1 illustrates a decentralized fleet of UAVs 100 deployed to merchant facilities 105A and 105B (collectively 105) distributed throughout a community 110, in accordance with an embodiment of the disclosure. Merchant facilities 105 may be neighborhood businesses servicing the surrounding communities including community 110. For example, merchant facilities 105 may include local convenience stores, pharmacies, grocery stores, hardware stores, restaurants, etc. Merchant facilities 105 may be unrelated businesses or different instances/franchises of a common retailer. In various embodiments, UAVs are owned and operated by an aerial package delivery service that deploys cabinets for storing, charging, and managing UAVs 100 into each of the subscribing merchants. The decentralized UAV fleet is remotely controlled from a remote command and control (e.g., cloud-based command and control). When an online order is received for a given merchant, on-site attendants at each merchant facility 105 is responsible for gathering the ordered item from their facility, selecting a UAV 100 from a cubby in their on-site cabinet, loading the purchased item into the selected UAV, and placing the loaded, mission ready UAV outside in a designated launch and landing area. The designated launch and landing area may be a back area behind their building, a cordoned off portion of their parking lot, or some other outdoor space surrounding the merchant facility. The attendant may be an employee of the merchant assigned the task of stocking UAVs 100 with products from online orders and transporting the UAVs between the inside protected cabinets and the outside designated launch and landing area.

Deploying a decentralized UAV fleet into merchant facilities dispersed about communities while also maintaining remote command and control over the UAV fleet by a UAV package delivery service provider has many benefits. The UAVs are deployed directly into the merchant facilities 105 avoiding the overhead expense associated with the merchants setting up branch facilities in remote locations bunched around a shared terminal area (e.g., airfield). UAVs 100 are decentralized thereby avoiding flight path bottlenecks and congestion points and avoiding concentrated noise centers. UAVs 100 are closer to the end customers placing the online orders and thus delivery times are reduced while also increasing the number of potential customers falling within flight range of the UAV fleet. Since UAVs 100 are stored and charged in cubbies stacked within a cabinet, UAVs 100 can be kept in safe, secure locations that are out of the weather and readily available to the merchants. Since command and control is retained by the UAV package delivery service, not only do the merchants not need to invest in extensive training, expertise, or equipment, but the UAV package delivery service can surge and/or redeploy UAVs 100 as needed across unrelated merchants. For example, if a local convenience store (e.g., merchant facility 105A) is having a holiday surge while a local pharmacy (e.g., merchant facility 105B) is relatively slow, then the remote command and control operated by the UAV package delivery service can instruct UAVs to return to the convenient store despite originating from the pharmacy. This large-scale sharing of a decentralized UAV fleet can reduce overall costs and enable the individual merchants to operate with smaller fleets than would otherwise be needed without cross-merchant surge capabilities.

Figure 2:
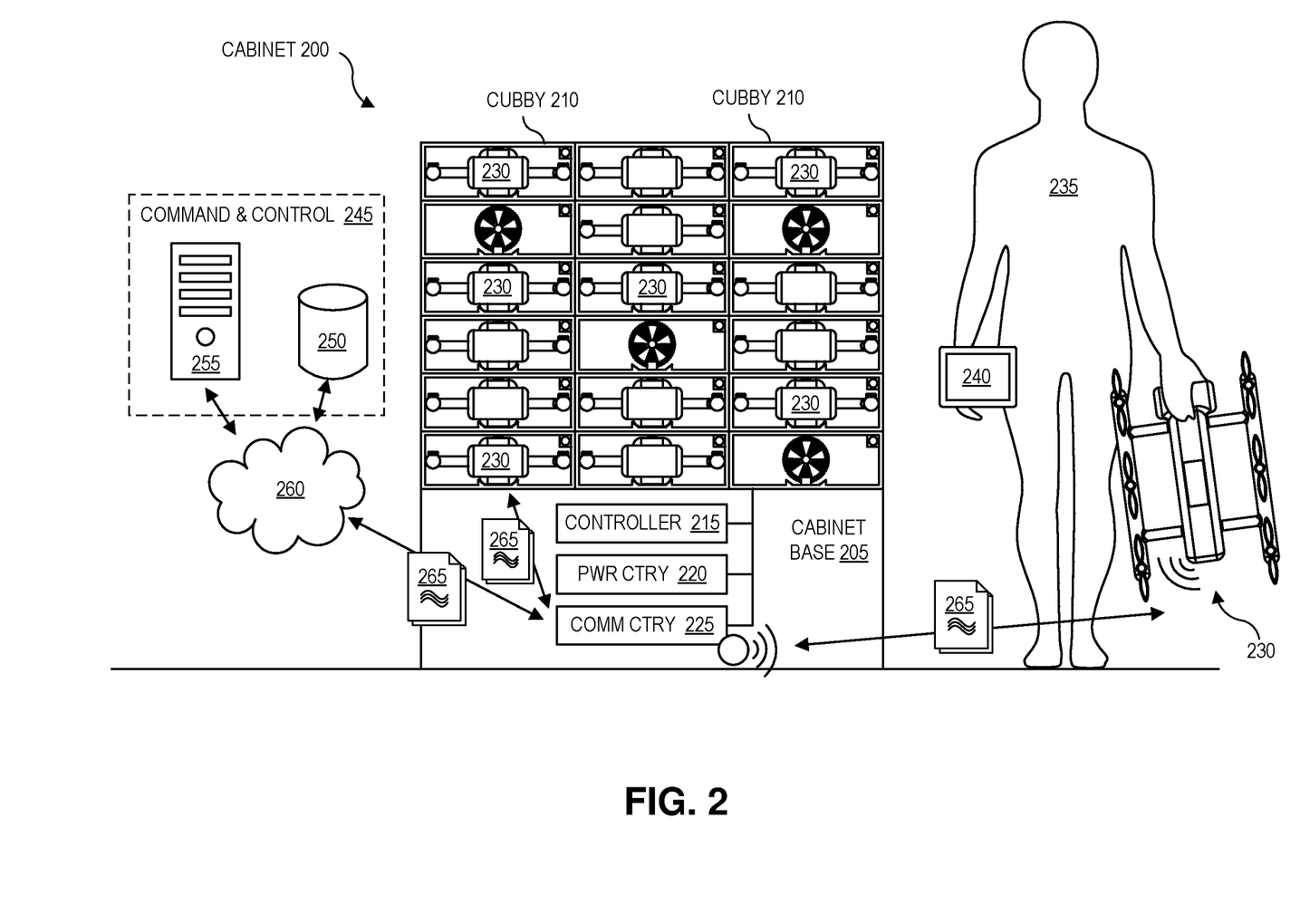
FIG. 2 illustrates a cabinet deployed within a merchant facility for storing, charging, and managing UAVs, in accordance with an embodiment of the disclosure.

FIG. 2 illustrates a cabinet 200 for deploying into a merchant facility, in accordance with an embodiment of the disclosure. The illustrated embodiment of cabinet 200 a plurality of cubbies 210 stacked in an array on a cabinet base 205 along with a controller 215, power circuitry 220, and communication circuitry 225 disposed in cabinet 200. As illustrated, each cubby 210 is sized and shaped to receive a UAV 230 (only some of which are labelled).

A merchant attendant 235 places UAVs 230 into cubbies 210 for storage and charging and retrieves a UAV 230 from cubbies 210 when notifications of new online orders are received at merchant terminal 240. Merchant terminal 240 is a local computing device such as a tablet, smart phone, laptop, desktop, scanner, etc., which is used by attendant 235 to receive notifications of online orders, associate online orders with a selected UAV 230, and otherwise communicate with the remote command and control 245 operated by the UAV package delivery service provider. In one embodiment, command and control 245 is a cloud-based service, which may include one or more databases 250 and servers 255 linked via a network 260 (e.g., the Internet) to cabinet 200. The online orders may arrive via an online marketplace maintained on servers 255, or via linking the merchants' own websites to command and control 245.

Communication circuitry 225 within cabinet 200 provides a communication conduit between command and control 245 and one or more of UAVs 230, controller 215, and merchant terminal 240. For example, communication circuitry 225 may include a wired adapter (e.g., local area network adapter, USB hub, etc.) for communicating with UAVs 230 that are physically stowed within one of cubbies 210 and a wireless adapter (e.g., wireless access point) for wirelessly communicating with UAVs 230 on-site at the merchant facility but external to cabinet 200. Power circuitry 220 provides battery charging capabilities to the UAVs 230 stowed within cubbies 210. Controller 215 includes one or more microprocessors, memory, and data storage for orchestrating/facilitating operations of the various components. For example, controller 215 may retrieve status information from UAVs 230 and relay this information to command and control 245, receive mission data from command and control 245 and relay/assign it to UAVs 230, and extract mission logs from UAVs 230 and relay them to command and control 245. The status information, mission data, and mission logs are graphically illustrated as data 265. Status information may include battery charge level, self-diagnostic information, etc. The mission data may include navigational data for flying a delivery mission. The mission logs may include sensor records from flying a delivery mission.

Cabinet 200 is sized for deployment inside a typical merchant facility. In one embodiment, controller 215, power circuitry 220, and communication circuitry 225 are housed in the cabinet base 205 and shared across cubbies 210 and UAVs 230. Cubbies 210 may be stackable into an array providing a modular cabinet with a variable number of cubbies stacked on cabinet base 205 for storing and charging a variable number of UAVs 230 dependent upon needs of a particular merchant facility.

Figure 3A:
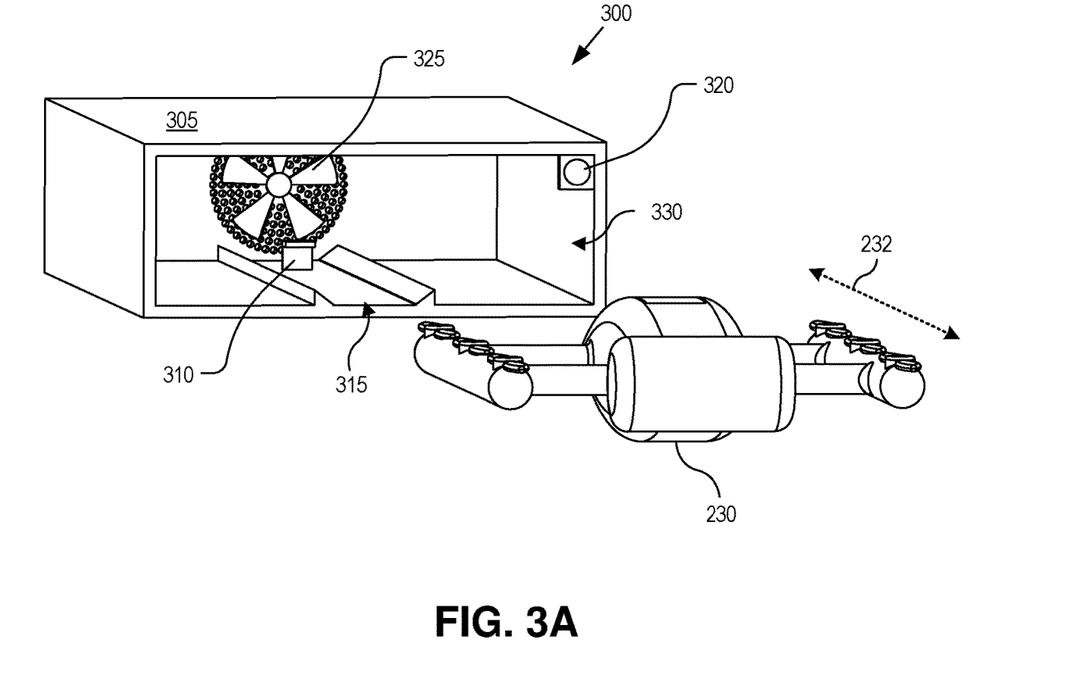
FIGS. 3A and 3B illustrate a cubby that may be stacked on a cabinet base for storing, charging, and communicating with UAVs deployed to a merchant facility, in accordance with an embodiment of the disclosure.
Figure 3B:
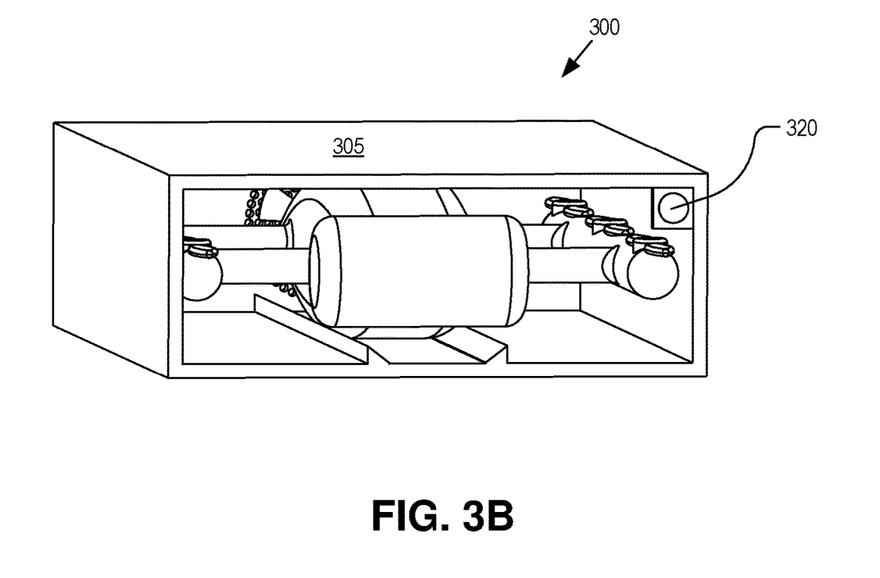

FIGS. 3A and 3B illustrate an example cubby 300 that may be stacked on cabinet base 205 for storing, charging, and communicating with UAVs deployed to a merchant facility, in accordance with an embodiment of the disclosure. Cubby 300 represents one possible implementation of cubbies 210 in FIG. 2. The illustrated embodiment of cubby 300 includes a housing 305, a cubby charging port 310, a guide 315, a status indicator 320, and ventilation components 325. The illustrated embodiment of housing 305 has a rectangular cuboid shape amenable to stacking with a front opening 330 for receiving UAV 230. UAV 230 can be inserted through front opening 330. Cubby charging port 310 is disposed within cubby 300 and positioned to engage with a UAV charging port (hidden from view in FIGS. 3A and 3B, see also FIGS. 4A and 4B) on UAV 230 when the UAV is stowed into cubby 300. Cubby charging port 310 and the UAV charging port may both include a data port for wired communications via communication circuitry 225. Guide 315 is shaped to engage with the fuselage of UAV 230 and align the UAV charging port to cubby charging port 310 when UAV 230 is inserted into cubby 300. Guide 315 may be implemented with rails, magnets, or otherwise.

Status indicator 320 is disposed on the front of each cubby 300 to be visible from the front of cabinet 200. Status indicator 320 provides a visible indication of the mission readiness of the corresponding UAV currently stowed within the cubby. For example, a fully charged UAV 230 may be indicated by a solid green light and a charging UAV may be indicated with a blinking light. Various colors and blinking patterns may be used to indicate battery charge level or other relevant mission ready status. Status indicator 320 may be a simple single or multi-color LED, or include a small display capable of displaying symbols and/or textual messages.

The illustrated embodiment of cubby 300 includes ventilation components 325 disposed within cubby 300 and configured to blow air across UAV 230 when UAV 230 is stowed within cubby 300. Ventilation may be commenced during rapid charging to cool UAV 230 and increase the longevity of its onboard battery. Additionally, ventilation may be provided when UAV 230 is deemed wet after executing a delivery mission in inclement weather. The determination that UAV 230 is wet may be based upon weather reports along its flight path at the time of its delivery mission, or based upon moisture sensors. In any event, providing drying ventilation can ease design constraints placed on UAVs 230 as they may only need to be weather resistant as opposed to watertight, if reliable drying is available after each delivery mission.

Referring to FIG. 3A, cubby 300 has a size and shape that closely conforms to the overall dimension of UAV 230 to provide high density, compact storage within the merchant facility. Accordingly, in one embodiment, UAV 230 includes dual-blade rotors that may be oriented relative to the fuselage of UAV 230 to minimize an overall width of UAV 230 for storage. For example, motor controllers (e.g., electronic speed controllers) within UAV 230 may be programmed to auto align each rotor with a longitudinal fuselage axis 232 when the rotors stop spinning, thereby reducing the overall width of UAV 230 for a close fit through front opening 330 of housing 305. FIG. 3B illustrates the low clearance fit requires the rotor blades be aligned with axis 232 for stowage into cubby 300. In alternative embodiments, the rotors may be hinged and passively aligned by physical contact with the sidewalls of cubby 300.

Figure 4A:
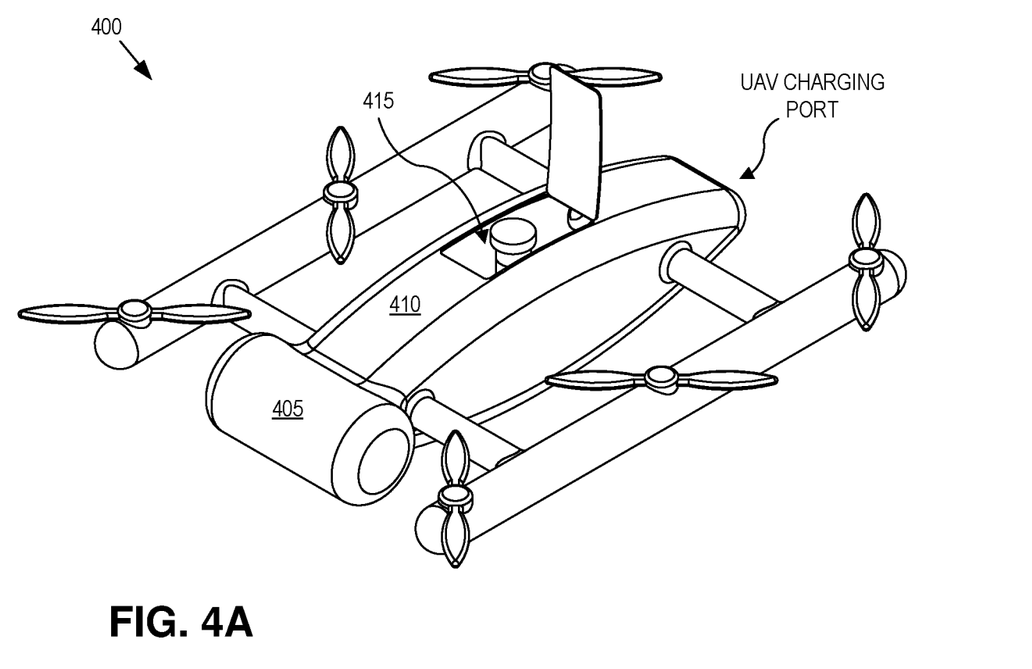
FIGS. 4A and 4B are perspective view illustrations of a vertical takeoff and land (VTOL) UAV having a top-loading, bottom-dropping package compartment and a grab handle molded into its fuselage, in accordance with an embodiment of the disclosure.
Figure 4B:
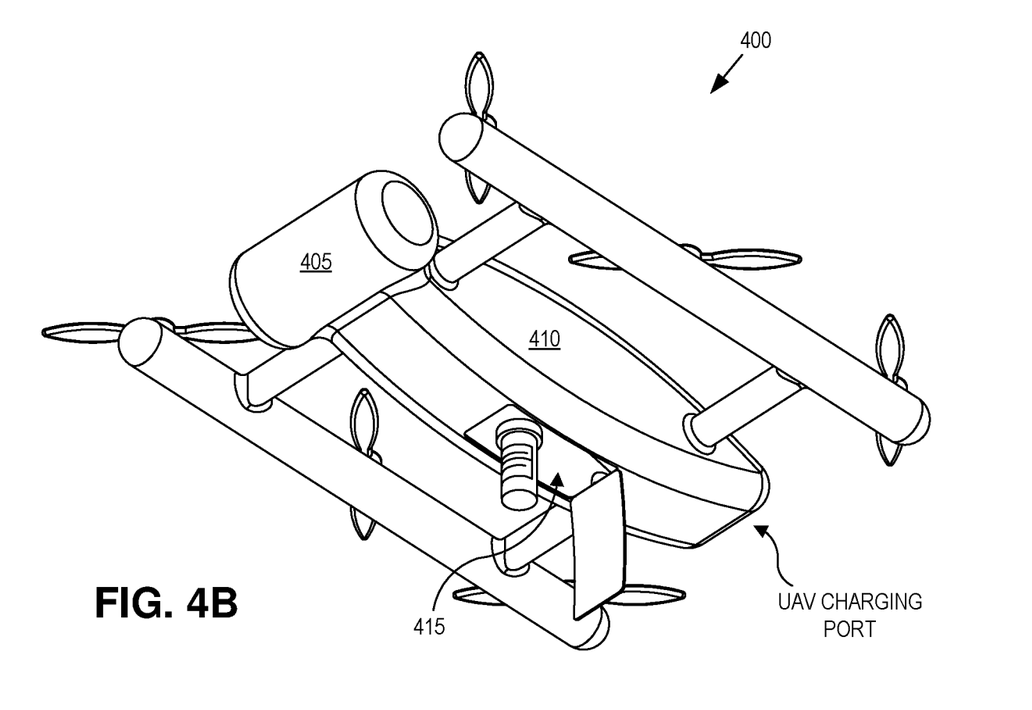

FIGS. 4A and 4B are perspective view illustrations of a UAV 400 having a compact design for small package deliveries, in accordance with an embodiment of the disclosure. UAV 400 represents one possible implementation of UAVs 100 or 230. The illustrated embodiment of UAV 400 is a vertical takeoff and land (VTOL) aircraft. In particular, the illustrated embodiment does not include aerodynamic wings capable of generating lift during forward cruise. Eliminating wings, but instead relying upon vertical lift rotors simplifies the design and onboard systems at the expense of range. However, a smaller UAV is well suited to replace short trips to local convenience stores or pharmacies in a neighborhood. The compact form factor is suitable for third party merchants to handle. The smaller, lighter airframe (relative to a fixed wing UAV) is easier to handle with fewer safety concerns.

In the illustrated embodiment, a handle 405 is molded into the nose of fuselage 410 of UAV 400 for holding by attendant 235. The nose (or tail) placement of handle 405 simplifies the insertion and removal of UAVs 400 into cubbies 210 (or 300). While handle 405 is illustrated as an integrated cylinder that allows a hand to wrap around and grab, it should be appreciated that handle 405 may assume a variety of other form factors and sizes. For example, handle 405 may be implemented as molded-in ridges, finger grabs, or otherwise. Other form factors may include a ring or drawer pull mounted to the hose or tail of fuselage 410.

Another design feature of UAV 400 illustrated in FIGS. 4A and 4B is the top-loading, bottom-dropping package compartment 415. This top-loading design enables a merchant to place UAV 400 on a table surface (e.g., see FIG. 6) while loading a package for aerial delivery into the UAV. The package may be loaded within the merchant facility, then the loaded UAV 400 carried outside and placed in a designated area for takeoff. This keeps the loaded package dry and minimizes the outside time for the attendant during rainy weather. The bottom-dropping design can simplify deliveries at customer premises. UAV 400 can simply hover over the delivery location and drop the package without landing. This can enable UAV 400 to hover above the ground (e.g., six feet or higher) when dropping the package to avoid on-site hazards (e.g., people, pets, plants, etc.).

As mentioned, the design of UAV 400 is well-suited for delivery of small, durable packages (e.g., 300 grams or so). UAV 400 is particularly suitable for delivering high value, small packages such as pharmacy prescriptions or small electronic devices (e.g., USB drives, etc.). The UAV package delivery system may be particularly beneficial for elderly or mobility impaired individuals to quickly and economically receive medication deliveries from their local pharmacy.

While the UAV package delivery system described herein is well-suited for use with smaller UAV frames that do not include large wing spans to achieve aerodynamic lift during forward cruise, it should be appreciated that larger UAVs with aerodynamic wings may still be used in various embodiments where longer range deliveries are desired. Such larger UAVs may be suitable for lower density settings such as rural or low-density suburban neighborhoods.

Figure 5:
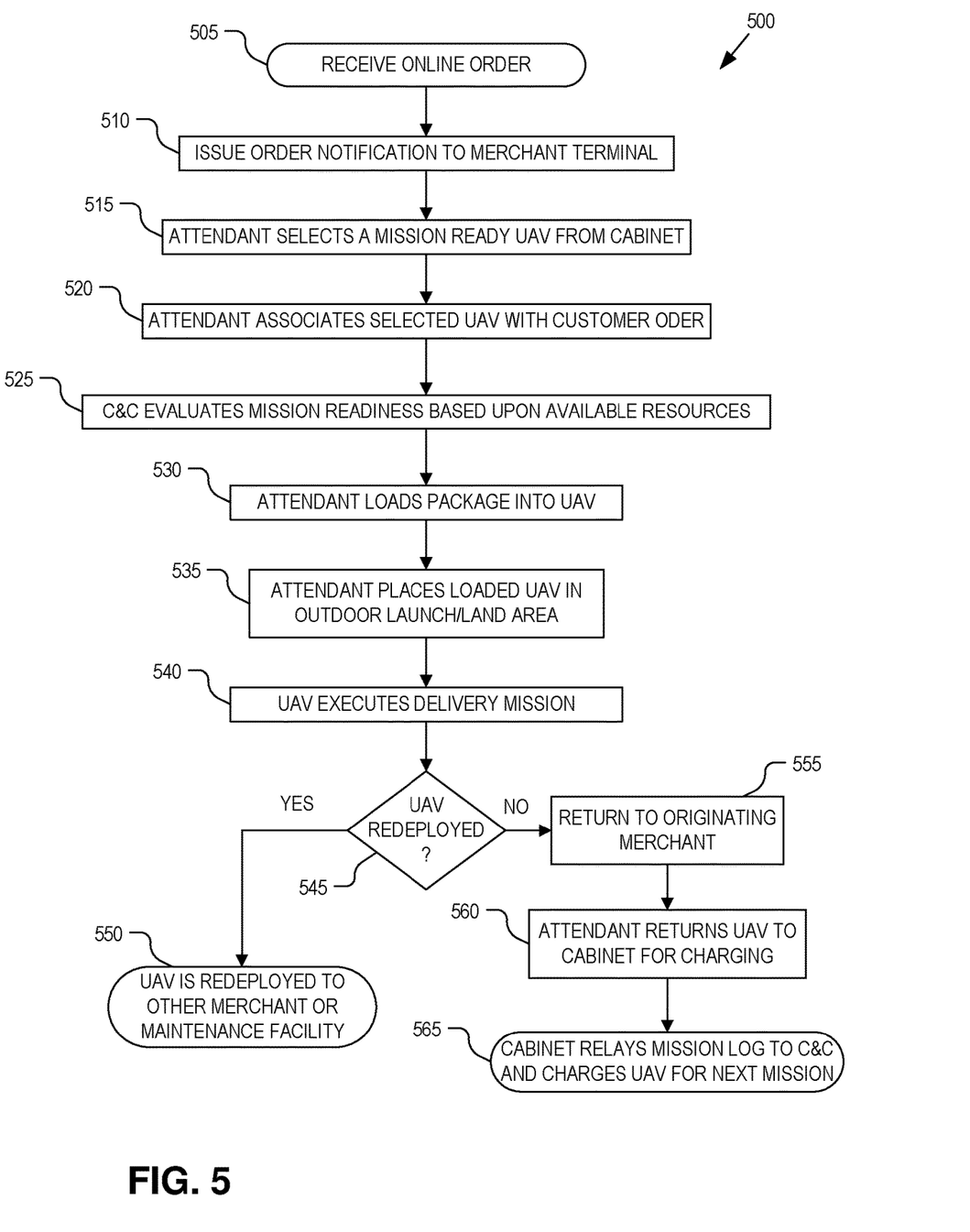
FIG. 5 is a flow chart illustrating a process for controlling a decentralized UAV fleet deployed to merchant facilities to provide the distributed merchant facilities with a shared aerial package delivery service that is remotely managed by an aerial delivery service provider, in accordance with an embodiment of the disclosure.

FIG. 5 is a flow chart illustrating a process 500 for controlling a decentralized UAV fleet deployed to distributed merchant facilities to provide a shared aerial package delivery service that is remotely managed by an aerial delivery service provider, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

Prior to executing process 500, it is expected that both the merchant and customers will enroll in the service. The merchant hosts a cabinet 200 on their premises and sets aside an appropriate outside launching and landing area while the customer designates a drop off delivery area. Validation of the merchant and/or customer may include onsite inspection, analysis of aerial photographs, merchant/customer provided photographs, etc. Once a merchant is enrolled, a cabinet and UAVs are deployed to their facility. Once a customer is enrolled, they may place an order (e.g., online order) with a participating merchant.

In a process block 505, an online order for a product sold at a participating merchant facility 105 is received. Orders may be for prescription medications, vitamins, makeup, small electronic devices, video disc rentals, paperwork courier services, etc. Orders may be received via an online marketplace hosted by the aerial delivery service provider on behalf of participating merchants, via the merchants' own websites, or otherwise. In response to a particular online order, an order notification is issued from command and control 245 to merchant terminal 240 (process block 510). The notification includes an identification of the product(s) ordered enabling attendant 235 to retrieve the requested product from their facility. The notification may also include delivery instructions such as a requested delivery window, special packaging instructions, or otherwise.

After receiving the order notification, an attendant 235 selects a UAV 230 from cabinet 200 that is mission ready (process block 515). The mission ready UAV 230 may be indicated via status indicator 320, which is readily viewable from the front of cabinet 200. Attendant 235 retrieves the mission ready UAV 230 (or 400) from its cubby 210 (or 300) by grabbing its integrated handle 405 and withdrawing it. Attendant 235 then associates the online order with the selected UAV 230 (process block 520) and loads the package into package compartment 415 (process block 530). The association between the package and the UAV 230 may include soliciting attendant 235 to input UAV tail numbers into merchant terminal 240, scanning both an order sticker adhered to the package and an optical code on the selected UAV 230 using merchant terminal 240 (or another handheld scanner), or otherwise. When associating the selected UAV 230 with an online order, command and control 245 may evaluate the mission readiness of the selected UAV 230 for the particular package before granting flight authorization. For example, the weight of certain products and/or distance of the customer from the merchant facility may require certain threshold charge levels that are not the same for all products or all customers. If attendant 235 selects a UAV 230 that is not sufficiently charged for a particularly heavy package or long-distance mission, then merchant terminal 240 may request selection of another UAV 230 with a greater charge level.

Figure 6:
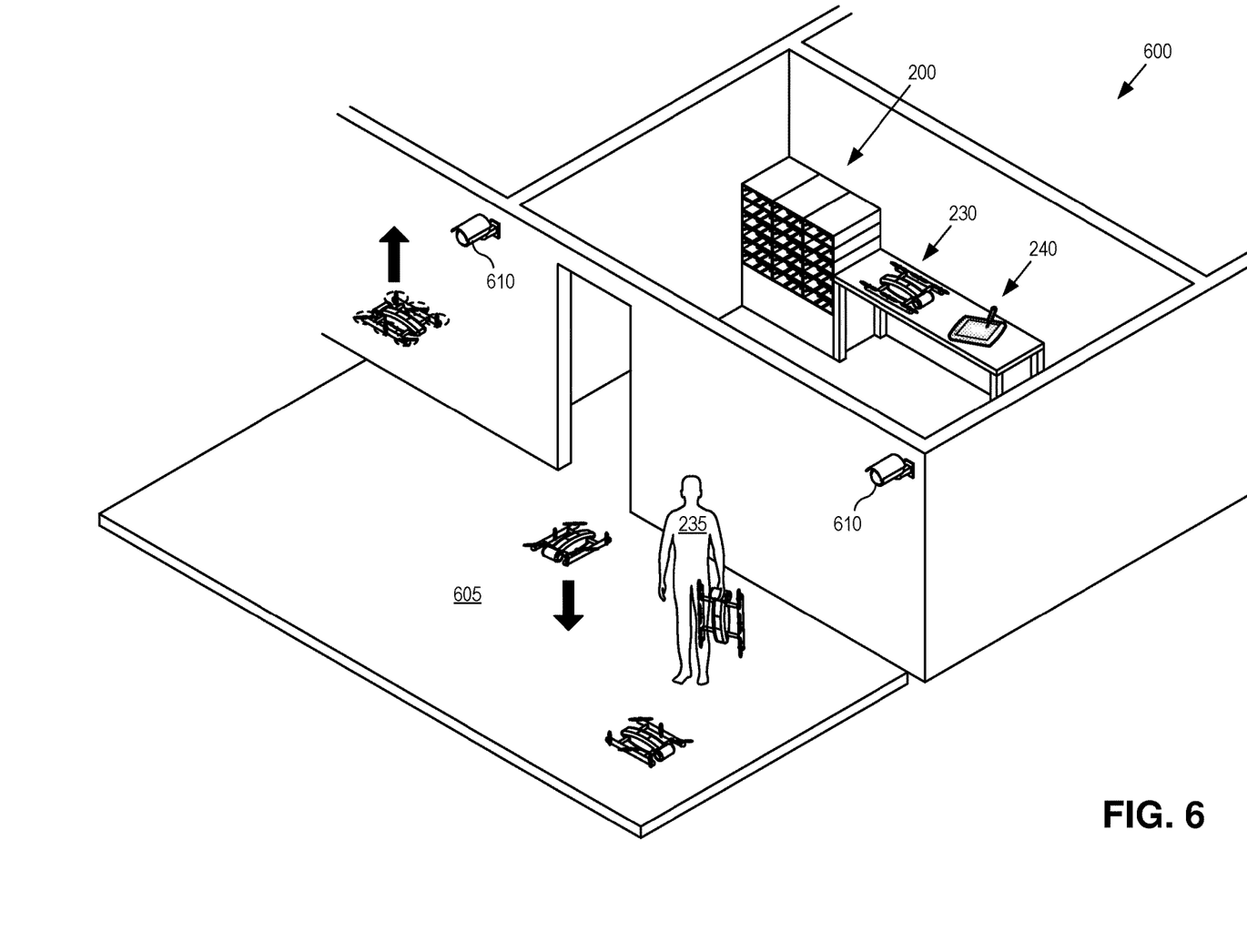
FIG. 6 illustrates an example merchant facility including an indoor cabinet for storing and charging UAVs and an outdoor designated launch and landing area, in accordance with an embodiment of the disclosure.

After the package and UAV 230 are associated, the delivery mission has authorized, and the package loaded, then merchant terminal 240 instructs attendant 235 to position the selected UAV outside in the designated launch and landing area (process block 535). FIG. 6 illustrates an example merchant facility 600 including a cabinet 200 of UAVs 230 securely stored indoors out of the weather and a designated outdoor launch and landing area 605. Once the loaded UAV 230 is positioned in launch and landing area 605, the UAV 230 commences and executes its delivery mission (process block 540). Outdoor sensors 610 may be positioned to monitor launch and landing area 605 for logistics, safety, and security. Sensors 610 may be communicatively coupled to cabinet 200, which in turn may relay data back to command and control 245 for data processing and analysis. In one embodiment, sensors 610 are video cameras.

After the selected UAV 230 has delivered its package to a customer (process block 540), it may either return back to the originating merchant facility or be redeployed. The redeployment decision may be performed by command and control 245 based upon a number of factors including the relative needs of the various merchants in the neighborhood, the status information of UAVs 230 currently charging in cabinets 200 deployed to the various merchant facilities, the health/maintenance status of the individual UAV, or otherwise. If the decision is to redeploy the UAV to another location (decision block 545), then the selected UAV may be instructed by command and control 245 to return to another merchant facility (different from where it originated) that is within its flight range (process block 550). Redeployment may be a preliminary decision made prior to UAV departing and thus uploaded into the UAV as mission data prior to leaving the originating merchant's facility. Alternatively, redeployment may be an on-the-fly decision made mid-mission by command and control 245, and thus communicated to the UAV via a cellular network. This redeployment may provide surge capabilities, rebalance the existing UAV fleet, or redirected the UAV to a maintenance facility. If the UAV is not redeployed (decision block 545), then the UAV returns to its originating merchant facility and lands in the designated launch and landing area 605 (process block 555). Arrival of the UAV 230 is communicated to merchant terminal 240 as a notification that the UAV 230 has landed, needs to be cleared from the launch and landing area 605, and is waiting to be returned to cabinet 200 by attendant 235 (process block 560).

Once the UAV 230 is returned to a cubby 210, its mission log is uploaded to command and control 245 via communication circuitry 225 (process block 565). In addition, the UAV 230 commences recharging and may also be dried via ventilation components 325 if the UAV is deemed to be wet.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An unmanned aerial vehicle (UAV) package delivery system, comprising:
a cabinet adapted for deployment inside a merchant facility, the cabinet configured for storing and charging a plurality of UAVs on-site at the merchant facility remote from a command and control of the UAVs, the cabinet including:
a plurality of cubbies, the cubbies each sized and shaped to receive one of the UAVs;
power circuitry configured for charging the UAVs when the UAVs are stowed within the cubbies;
communication circuitry configured for communicating with the UAVs when the UAVs are proximate to the cabinet or stowed within the cubbies, the communication circuitry further configured to communicate with the command and control; and
a controller including logic that when executed by the controller causes the UAV package delivery system to perform operations including:
retrieving status information from the UAVs;
relaying the status information to the command and control; and relaying mission data between the command and control and the UAVs to assign delivery missions to the UAVs and to extract mission logs from the UAVs, wherein a first cubby of the cubbies includes:
a cubby charging port disposed in the first cubby and positioned to engage with a UAV charging port disposed on a first UAV of the UAVs when the first UAV is stowed into the first cubby; and
a guide shaped to engage with the first UAV and align the UAV charging port to the cubby charging port when the first UAV is inserted into the first cubby, wherein each of the cubbies includes a status indicator visible from a front of the cabinet, the status indicator visibly indicating a mission readiness of a corresponding one of the UAVs stowed within a corresponding one of the cubbies.

2. The UAV package delivery system of claim 1, wherein the cabinet comprises a modular cabinet in which a variable number of cubbies are stackable on a cabinet base for storing and charging a variable number of the UAVs, wherein the power circuitry and the communication circuitry are disposed within the cabinet and shared by the cubbies.

3. The UAV package delivery system of claim 1, wherein the first cubby comprises:
a housing having a rectangular cuboid shape and a front opening for receiving the first UAV, wherein the guide is shaped to engage with a fuselage of the first UAV.

4. The UAV package delivery system of claim 3, wherein the first UAV comprises:
a plurality of rotors mounted to provide lift to the first UAV; and
one or more motor controllers configured to auto-align the rotors relative to the fuselage when the rotors stop spinning thereby reducing an overall width of the first UAV to fit into the front opening of the housing.

5. The UAV package delivery system of claim 1, wherein the communication circuitry includes a wireless adapter configured to wirelessly communicate with the UAVs when the UAVs are on-site at the merchant facility but external to the cabinet, and a wired adapter configured to communicate with the UAVs over wired connections when the UAVs are disposed within the cubbies.

6. The UAV package delivery system of claim 1, wherein the cubbies comprise:
ventilation components disposed within the cubbies and configured to blow air across the UAVs when the UAVs are stowed within the cubbies.

7. The UAV package delivery system of claim 6, wherein the controller includes further logic that when executed by the controller cause the UAV package delivery system to perform further operations comprising:
blowing the air across a given one of the UAVs when charging the given one of the UAVs to cool the given one of the UAVs during the charging; and
blowing the air across the given one of the UAVs when the given one of the UAVs is deemed wet from one of the delivery missions.

8. The UAV package delivery system of claim 1, further comprising at least one sensor communicatively connected to the controller within the cabinet and positioned adjacent to a designated launch or landing area at the merchant facility, and wherein the controller includes further logic that when executed by the controller causes the UAV package delivery system to perform further operations including:
monitoring the designated launch or landing area at the merchant facility; and notifying an attendant at the merchant facility when one of the UAVs has arrived and needs to be placed into one of the cubbies.

9. The UAV package delivery system of claim 1, wherein the command and control is configured to communicate with a plurality of the cabinets deployed to a plurality of different merchant facilities, and wherein the command and control stores instructions that when executed cause the UAV package delivery system to perform operations comprising:
monitoring the status information received from the cabinets deployed to the different merchant facilities; and
determining whether to rebalance deployment of the UAVs between the different merchant facilities based at least in part upon the status information received from two or more of the cabinets.

10. The UAV package delivery system of claim 1, wherein the command and control stores instructions that when executed cause the UAV package delivery system to perform operations comprising:
instructing one of the UAVs after delivering a package associated with a selected one of the delivery missions to return to a different merchant facility than from which the selected one of the delivery missions originated.

11. An unmanned aerial vehicle (UAV) package delivery system, comprising:
a cabinet adapted for deployment inside a merchant facility, the cabinet configured for storing and charging a plurality of UAVs on-site at the merchant facility remote from a command and control of the UAVs, the cabinet including:
a plurality of cubbies, the cubbies each sized and shaped to receive one of the UAVs;
power circuitry configured for charging the UAVs when the UAVs are stowed within the cubbies;
communication circuitry configured for communicating with the UAVs when the UAVs are proximate to the cabinet or stowed within the cubbies, the communication circuitry further configured to communicate with the command and control; and
a controller including logic that when executed by the controller causes the UAV package delivery system to perform operations including:
retrieving status information from the UAVs;
relaying the status information to the command and control; and
relaying mission data between the command and control and the UAVs to assign delivery missions to the UAVs and to extract mission logs from the UAVs, wherein a first cubby of the cubbies includes:
a cubby charging port disposed in the first cubby and positioned to engage with a UAV charging port disposed on a first UAV of the UAVs when the first UAV is stowed into the first cubby; and
a guide shaped to engage with the first UAV and align the UAV charging port to the cubby charging port when the first UAV is inserted into the first cubby, wherein the UAVs are each vertical takeoff and land (VTOL) aircraft having a top-loading, bottom-dropping package compartment.

12. The UAV package delivery system of claim 11, wherein the UAVs have handles molded into noses of fuselages of the UAVs for holding by an attendant to facilitate insertion and removal of the UAVs into the cubbies.

13. A method of centralized control over a decentralized UAV fleet stored in cabinets located at merchant facilities geographically dispersed across one or more communities serviced by the merchant facilities, the method comprising:
receiving an online order at a command and control for the decentralized UAV fleet;
issuing an order notification to a merchant terminal disposed at a first merchant facility of the merchant facilities;
sending mission data from the command and control to a first UAV located at the first merchant facility;
monitoring status information received from the cabinets deployed to the merchant facilities; and
determining whether to rebalance deployment of the UAVs between the merchant facilities based at least in part upon the status information received from the cabinets,
wherein the cabinets are each configured to store and charge a plurality of UAVs of the decentralized UAV fleet on-site at a corresponding one of the merchant facilities.

14. The method of claim 13, wherein the mission data comprises navigational data for the first UAV to navigate from the first merchant facility and deliver a package to a customer premises associated with the online order.

15. The method of claim 13, wherein sending the mission data from the command and control to the first UAV comprises:
sending the mission data to the first UAV via communication circuitry disposed in a first cabinet of the cabinets that is located at the first merchant facility.

16. The method of claim 15, further comprising:
notifying the merchant terminal when one of the UAVs of the decentralized fleet of UAVs has arrived at the first merchant facility and needs to be placed into a cubby of the first cabinet for charging.

17. The method of claim 13, further comprising:
rebalancing deployment of the UAVs between the merchant facilities by instructing a given UAV to return to a different one of the merchant facilities after delivering a package than from which the given UAV originated.

18. The method of claim 13, wherein determining whether to rebalance the deployment of the UAVs between the merchant facilities includes:
identifying one of the merchant facilities requiring additional UAVs to satisfy customer orders; and
identifying another one of the merchant facilities with excess mission ready UAVs.

19. An unmanned aerial vehicle (UAV) package delivery system, comprising:
a cabinet adapted for deployment inside a merchant facility, the cabinet configured for storing and charging a plurality of UAVs on-site at the merchant facility remote from a command and control of the UAVs, the cabinet including:
a plurality of cubbies, the cubbies each sized and shaped to receive one of the UAVs;
power circuitry configured for charging the UAVs when the UAVs are stowed within the cubbies;
communication circuitry configured for communicating with the UAVs when the UAVs are proximate to the cabinet or stowed within the cubbies, the communication circuitry further configured to communicate with the command and control; and
a controller including logic that when executed by the controller causes the UAV package delivery system to perform operations including:
retrieving status information from the UAVs;
relaying the status information to the command and control; and
relaying mission data between the command and control and the UAVs to assign delivery missions to the UAVs and to extract mission logs from the UAVs,
wherein a first cubby of the cubbies includes:
a housing having a rectangular cuboid shape and a front opening for receiving a first UAV of the UAVs;
a cubby charging port disposed in the first cubby and positioned to engage with a UAV charging port disposed on the first UAV when the first UAV is stowed into the first cubby; and
a guide shaped to engage a fuselage of the first UAV and align the UAV charging port to the cubby charging port when the first UAV is inserted into the first cubby.

20. An unmanned aerial vehicle (UAV) package delivery system, comprising:
a cabinet adapted for deployment inside a merchant facility, the cabinet configured for storing and charging a plurality of UAVs on-site at the merchant facility remote from a command and control of the UAVs, the cabinet including:
a plurality of cubbies, the cubbies each sized and shaped to receive one of the UAVs;
power circuitry configured for charging the UAVs when the UAVs are stowed within the cubbies;
communication circuitry configured for communicating with the UAVs when the UAVs are proximate to the cabinet or stowed within the cubbies, the communication circuitry further configured to communicate with the command and control; and
a controller including logic that when executed by the controller causes the UAV package delivery system to perform operations including:
retrieving status information from the UAVs;
relaying the status information to the command and control; and
relaying mission data between the command and control and the UAVs to assign delivery missions to the UAVs and to extract mission logs from the UAVs; and
at least one sensor communicatively connected to the controller and positioned adjacent to a designated launch or landing area at the merchant facility, and wherein the controller includes further logic that when executed by the controller causes the UAV package delivery system to perform further operations including:
monitoring the designated launch or landing area at the merchant facility; and
issuing a notification to an attendant at the merchant facility when one of the UAVs arrives and should be placed into one of the cubbies.

* * * * *